US009857263B2

(12) United States Patent
Dudar

(10) Patent No.: US 9,857,263 B2
(45) Date of Patent: Jan. 2, 2018

(54) SYSTEMS AND METHODS FOR EVAPORATIVE EMISSIONS TESTING

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 14/338,025

(22) Filed: Jul. 22, 2014

(65) Prior Publication Data

US 2016/0025588 A1 Jan. 28, 2016

(51) Int. Cl.
*G01K 13/02* (2006.01)
*G01M 3/02* (2006.01)
*G01K 3/14* (2006.01)

(52) U.S. Cl.
CPC .............. *G01M 3/025* (2013.01); *G01K 3/14* (2013.01)

(58) Field of Classification Search
CPC ... G01M 3/025; G01K 13/02; F02M 25/0809; F02M 25/0818
USPC ................... 73/40.5 R, 40.5, 40, 50
See application file for complete search history.

(56) References Cited

U.S. PATENT DOCUMENTS

| 5,263,462 A | 11/1993 | Reddy | |
|---|---|---|---|
| 5,525,881 A * | 6/1996 | Desrus | H02H 6/005 180/446 |
| 5,560,347 A * | 10/1996 | Reddy | G01N 27/12 123/520 |
| 5,712,590 A * | 1/1998 | Dries | G05F 3/227 323/313 |
| 5,999,876 A * | 12/1999 | Irons | F02D 41/263 701/115 |
| 6,088,661 A * | 7/2000 | Poublon | F02D 41/18 374/133 |
| 6,401,528 B1 * | 6/2002 | Lambert | F02M 25/0809 73/114.39 |
| 8,074,627 B2 | 12/2011 | Siddiqui | |
| 2004/0030487 A1 * | 2/2004 | Streib | F02M 25/0809 701/114 |
| 2004/0122565 A1 * | 6/2004 | Sakurai | F02D 41/062 701/1 |

(Continued)

FOREIGN PATENT DOCUMENTS

DE    102005007324 A1 *   9/2005  ............. F02D 41/02

OTHER PUBLICATIONS

Translation DE 102005007324 A1.*

(Continued)

*Primary Examiner* — Natalie Huls
*Assistant Examiner* — Monica S Young
(74) *Attorney, Agent, or Firm* — James Dottavio; McCoy Russell LLP

(57) ABSTRACT

A method for a vehicle, comprising: following a vehicle-off event, waking a powertrain control module based on a comparison of an ambient temperature and a bulk fuel temperature; and then initiating an evaporative emissions system leak test. In this way, the evaporative emission leak test may be initiated without waking the powertrain control module arbitrarily. By waking the powertrain control module and initiating the test based on ambient and bulk fuel temperatures the execution rate of the leak test can be increased.

20 Claims, 5 Drawing Sheets

(56) References Cited

U.S. PATENT DOCUMENTS

| | | | |
|---|---|---|---|
| 2005/0187681 A1* | 8/2005 | Suzuki | F02M 25/0809 713/1 |
| 2010/0060341 A1* | 3/2010 | Zegheru | G01K 7/01 327/512 |
| 2010/0212338 A1* | 8/2010 | Hermann | B60H 1/00278 62/118 |
| 2011/0139130 A1* | 6/2011 | Siddiqui | F02M 25/0818 123/520 |
| 2012/0079873 A1* | 4/2012 | Jackson | B60K 15/03519 73/49.3 |
| 2012/0097252 A1* | 4/2012 | McLain | F02M 25/0809 137/1 |

OTHER PUBLICATIONS

2007 Toyota Prius Evaporative System Service Manual, relevant manual p. ES-349, 23 pages.
2011 Chevy Volt Service Manual, relevant manual p. 9-270, 4 pages.
Anonymous, "A Carbon Canister Integrity Diagnostic for PHEV Using Diurnal Temperature Cycle," IPCOM No. 000240457, Published Jan. 30, 2015, 2 pages.
Anonymous, "A Method to Detect Tiny Fuel Tank Liquid Leaks," IPCOM No. 000241982, Published Jun. 11, 2015, 2 pages.

* cited by examiner

SYSTEMS AND METHODS FOR EVAPORATIVE EMISSIONS TESTING

BACKGROUND AND SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere.

Hybrid vehicles and other vehicles with inherently low manifold vacuum may perform leak tests while the vehicle is turned off. In some examples, the leak test is based on natural pressure or vacuum that occurs in the fuel tank due to fuel heating or cooling. In some examples, the fuel system may include a vacuum pump configured to draw a vacuum on the fuel tank and evaporative emissions system. In order to increase the accuracy of the leak test, the test may be initiated at a time point following vehicle shut-off, thus allowing for the bulk fuel temperature to stabilize, thus reducing one noise factor that may impact a test result.

However, in order to conserve battery charge to perform the test following a vehicle off condition, the vehicle powertrain control module (PCM) must first be put to sleep, then re-awakened. Waking the PCM at an arbitrary time following the vehicle off condition does not guarantee that the fuel temperature will be stable, or that other conditions for a leak test are met. A vehicle parked in the sun during the day may experience an increase in fuel temperature. Waking the PCM unnecessarily wastes stored battery charge. Executing the leak test at during inopportune conditions may cause false failures that impact the test efficacy. Further, initiating a leak test that will be aborted may involve cycling system valves open and closed, reducing their expected lifespan.

The inventors herein have recognized the above issues and have developed systems and methods to at least partially address them. In one example, a method for a vehicle, comprising: following a vehicle-off event, waking a powertrain control module based on a comparison of an ambient temperature and a bulk fuel temperature; and then initiating an evaporative emissions system leak test. In this way, the evaporative emission leak test may be initiated without waking the powertrain control module arbitrarily. At an arbitrary time point, changes in weather following the vehicle-off event may lead to a failure to meet testing entry conditions, thus reducing the execution rate of the leak test. By waking the powertrain control module and initiating the test based on ambient and bulk fuel temperatures the execution rate can be increased.

In another example, a fuel system for a vehicle, comprising: a powertrain control module comprising a wake input, the wake input configured to wake the powertrain control module responsive to a ratio of a bulk fuel temperature to an ambient air temperature decreasing below a threshold. In this way, the evaporative emission leak test may be initiated when conditions indicate the test is likely to run to completion. In turn, this will decrease the number of false test results and increase the robustness of the test.

In yet another example, an evaporative emissions system for a vehicle, comprising: a fuel tank coupled to a fuel vapor canister; a powertrain control module comprising a wake input; a comparator circuit coupled to the wake input, the comparator circuit configured to output a voltage indicating a ratio of engine coolant temperature to ambient temperature; and wherein the powertrain control module is configured with instructions stored in non-transitory memory that when executed cause the powertrain control module to: sleep following a vehicle-off event; wake responsive to the wake input indicating that the ratio of engine coolant temperature to ambient air temperature has decreased below a threshold; and then initiate an evaporative emissions system leak test; and set a diagnostic code responsive to results of the evaporative emissions system leak test. In this way, battery charge may be conserved by not waking the power train control module arbitrarily. Further, by only initiating the leak test when the test is likely to run to completion, wear and tear on fuel system valves may be reduced, increasing the performance life of the valves.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows a cooling system for a vehicle.

FIG. 2 schematically shows a fuel system and emissions system for a vehicle engine.

FIG. 3 schematically shows a circuit for waking up a powertrain control module.

DETAILED DESCRIPTION

Figure 1:
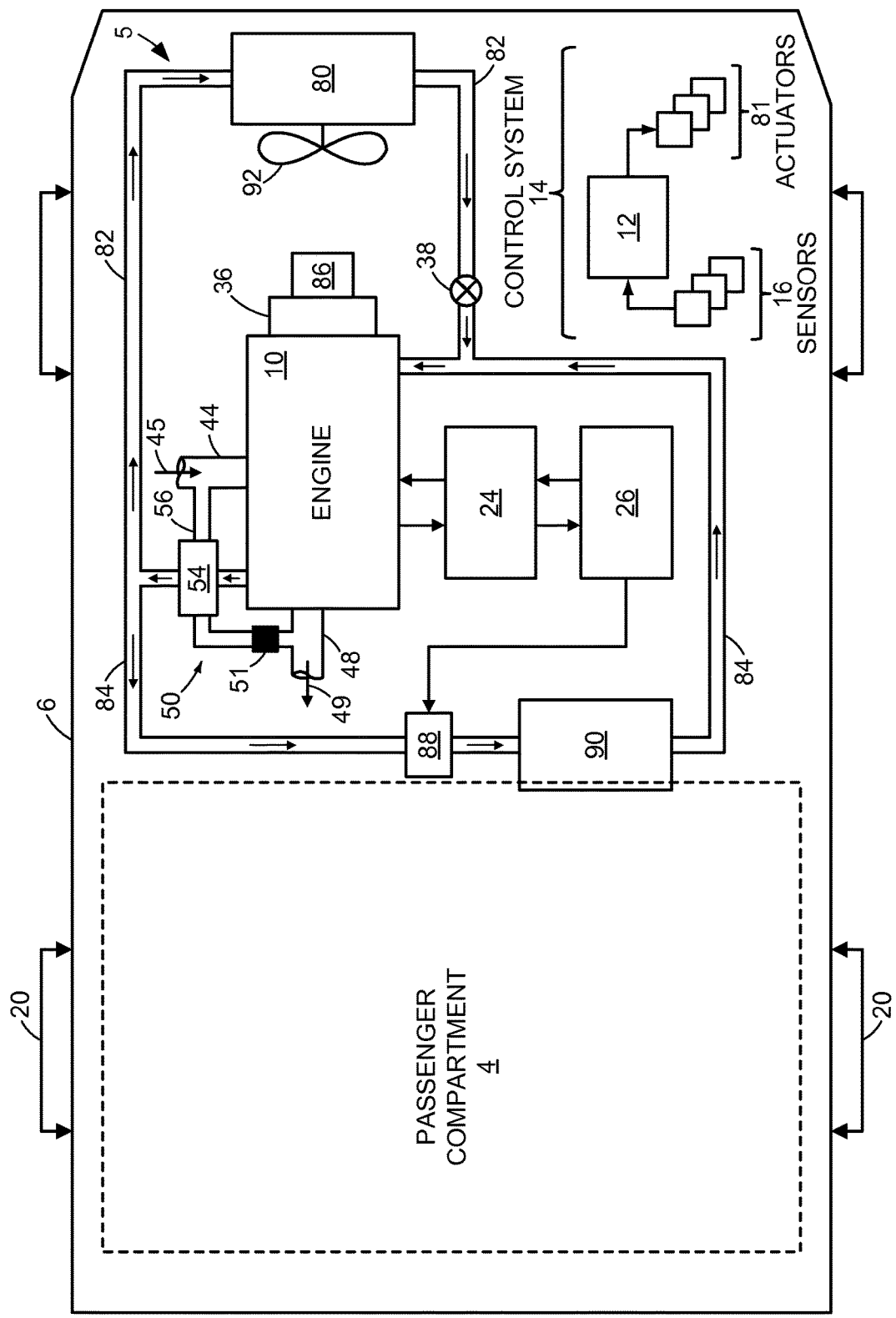
Figure 2:
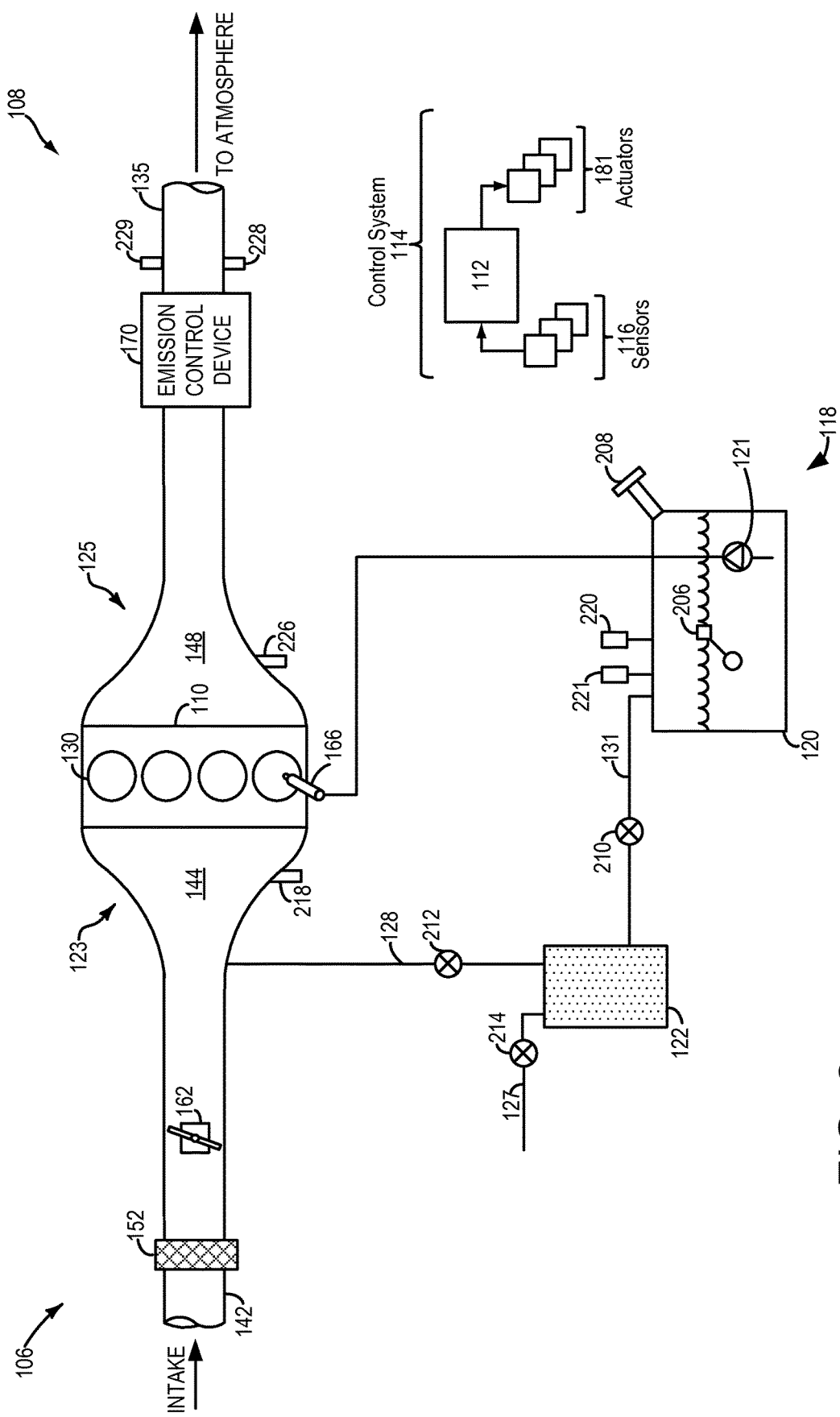
Figure 3:
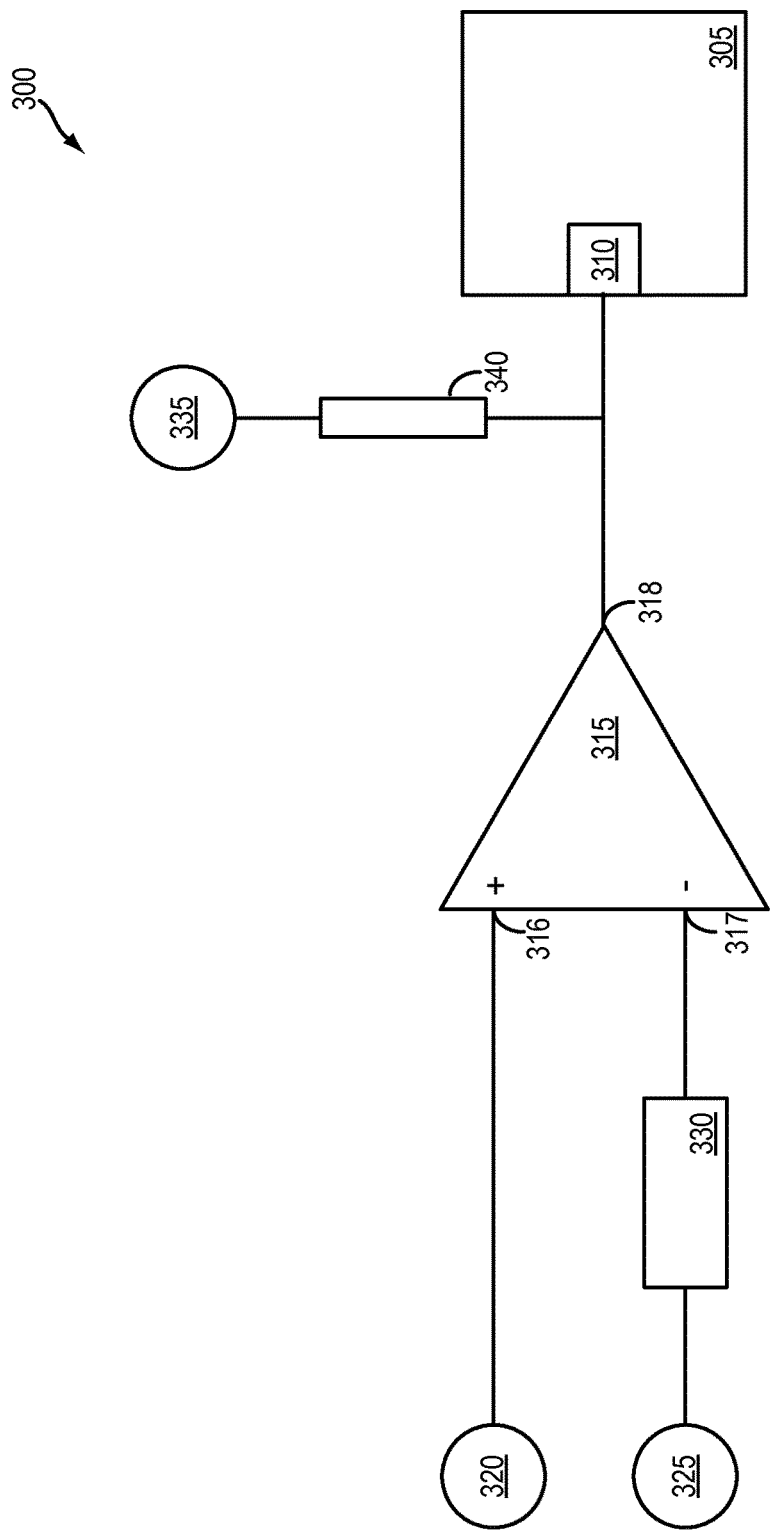
Figure 4:
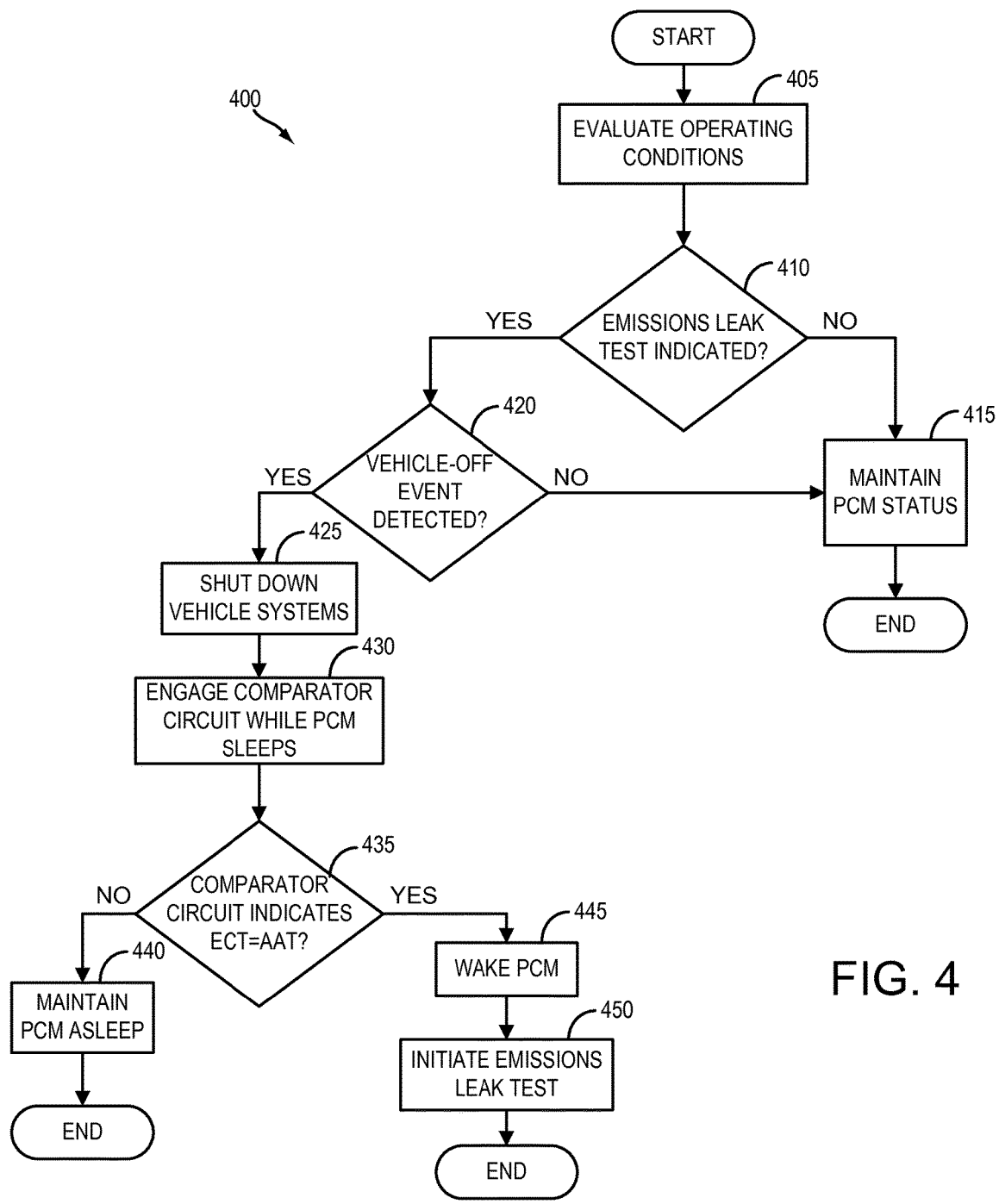
FIG. 4 shows a flow chart for a high-level method for an evaporative emissions test for a hybrid vehicle.
Figure 5:
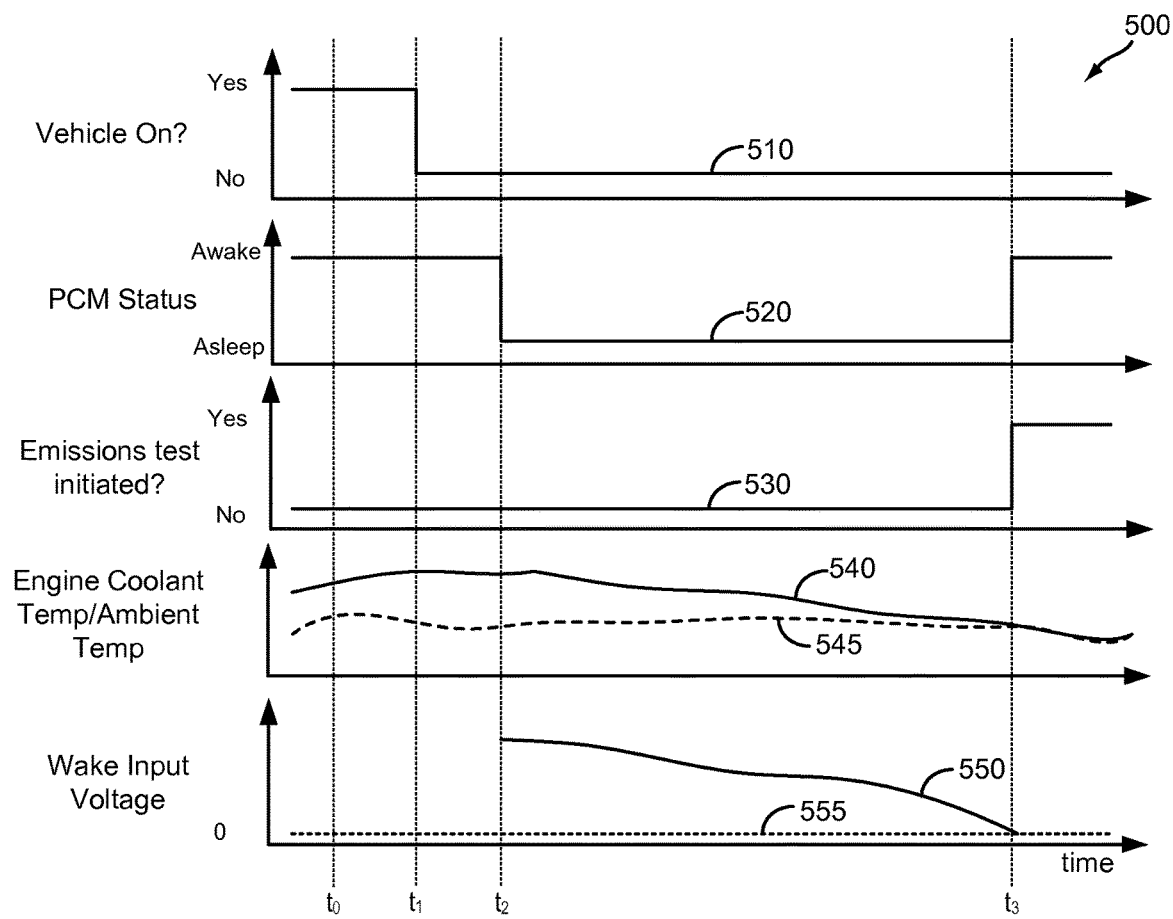
FIG. 5 shows an example timeline for an evaporative emissions test using the method of FIG. 4.

This detailed description relates to systems and methods for performing a leak test for a vehicle fuel system. In particular, this description relates to systems and methods for initiating a leak test by waking a powertrain control module when a bulk fuel temperature is within a threshold of an ambient temperature. The vehicle may include a coolant system, as depicted in FIG. 1 as well as an evaporative emissions system, as depicted in FIG. 2. The powertrain control module may comprise a wake input coupled to a comparator circuit, as depicted in FIG. 3. The comparator circuit may be configured to indicate a ratio of bulk fuel temperature to ambient temperature, allowing for the powertrain control module to initiate a leak test when the ratio decreases below a threshold. FIG. 4 depicts a flow chart for a method for an evaporative emissions test using the systems of FIGS. 1-3. FIG. 5 depicts a timeline for an example evaporative emissions test utilizing the method of FIG. 4.

FIG. 1 shows an example embodiment of a cooling system 5 in a motor vehicle 6 is illustrated schematically. Cooling system 5 circulates coolant through internal combustion engine 10 and exhaust gas recirculation (EGR) cooler 54 to absorb waste heat and distributes the heated coolant to radiator 80 and/or heater core 90 via coolant lines 82 and 84, respectively.

In particular, FIG. 1 shows cooling system 100 coupled to engine 10 and circulating engine coolant from engine 10, through EGR cooler 54, and to radiator 80 via engine-driven water pump 86, and back to engine 10 via coolant line 82. Engine-driven water pump 86 may be coupled to the engine via front end accessory drive (FEAD) 36, and rotated proportionally to engine speed via belt, chain, etc. Specifically, engine-driven pump 86 circulates coolant through passages in the engine block, head, etc., to absorb engine heat, which is then transferred via the radiator 80 to ambient air. In an example where pump 86 is a centrifugal pump, the pressure (and resulting flow) produced may be proportional to the crankshaft speed, which may be directly proportional to engine speed. The temperature of the coolant may be regulated by a thermostat valve 38, located in the coolant line 82, which may be kept closed until the coolant reaches a threshold temperature.

Further, fan 92 may be coupled to radiator 80 in order to maintain an airflow through radiator 80 when vehicle 6 is moving slowly or stopped while the engine is running. In some examples, fan speed may be controlled by controller 12. Alternatively, fan 92 may be coupled to engine-driven water pump 86.

As shown in FIG. 1, engine 10 may include an exhaust gas recirculation (EGR) system 50. EGR system 50 may route a desired portion of exhaust gas from exhaust manifold 48 to intake manifold 44 via EGR passage 56. The amount of EGR provided to intake manifold 44 may be varied by controller 12 via EGR valve 51. Further, an EGR sensor (not shown) may be arranged within EGR passage 56 and may provide an indication of one or more of pressure, temperature, and concentration of the exhaust gas. Alternatively, the EGR may be controlled based on an exhaust oxygen sensor and/or and intake oxygen sensor. Under some conditions, EGR system 50 may be used to regulate the temperature of the air and fuel mixture within the combustion chamber. EGR system 50 may further include EGR cooler 54 for cooling exhaust gas 49 being reintroduced to engine 10. In such an embodiment, coolant leaving engine 10 may be circulated through EGR cooler 54 before moving through coolant line 82 to radiator 80.

After passing through EGR cooler 54, coolant may flow through coolant line 82, as described above, and/or through coolant line 84 to heater core 90 where the heat may be transferred to passenger compartment 4, and the coolant flows back to engine 10. In some examples, engine-driven pump 86 may operate to circulate the coolant through both coolant lines 82 and 84. In other examples, such as the example of FIG. 2 in which vehicle 102 has a hybrid-electric propulsion system, an electric auxiliary pump 88 may be included in the cooling system in addition to the engine-driven pump. As such, auxiliary pump 88 may be employed to circulate coolant through heater core 90 during occasions when engine 10 is off (e.g., electric only operation) and/or to assist engine-driven pump 86 when the engine is running, as will be described in further detail below. Like engine-driven pump 86, auxiliary pump 88 may be a centrifugal pump; however, the pressure (and resulting flow) produced by pump 88 may be proportional to an amount of power supplied to the pump by energy storage device 26.

In this example embodiment, the hybrid propulsion system includes an energy conversion device 24, which may include a motor, a generator, among others and combinations thereof. The energy conversion device 24 is further shown coupled to an energy storage device 26, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels 20, engine 10 (e.g., provide a motor operation), auxiliary pump 88, etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. Additionally, the various components described above may be controlled by vehicle controller 12 (described below).

From the above, it should be understood that the exemplary hybrid-electric propulsion system is capable of various modes of operation. In a full hybrid implementation, for example, the propulsion system may operate using energy conversion device 24 (e.g., an electric motor) as the only torque source propelling the vehicle. This "electric only" mode of operation may be employed during braking, low speeds, while stopped at traffic lights, etc. In another mode, engine 10 is turned on, and acts as the only torque source powering drive wheel 20. In still another mode, which may be referred to as an "assist" mode, the hybrid propulsion system may supplement and act in cooperation with the torque provided by engine 10. As indicated above, energy conversion device 24 may also operate in a generator mode, in which torque is absorbed from engine 10 and/or the transmission. Furthermore, energy conversion device 24 may act to augment or absorb torque during transitions of engine 10 between different combustion modes (e.g., during transitions between a spark ignition mode and a compression ignition mode).

FIG. 2 shows a schematic depiction of a hybrid vehicle system 106 that can derive propulsion power from engine system 108 and/or an on-board energy storage device, such as a battery system. An energy conversion device, such as the energy conversion device shown in FIG. 1, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 108 is coupled to a fuel system 118. Fuel system 118 includes a fuel tank 120 coupled to a fuel pump 121 and a fuel vapor canister 122. During a fuel tank refueling event, fuel may be pumped into the vehicle from an external source through refueling port 208. Fuel tank 120 may hold a plurality of fuel blends, including fuel with a range of alcohol concentrations, such as various gasoline-ethanol blends, including E10, E85, gasoline, etc., and combinations thereof. A fuel level sensor 206 located in fuel tank 120 may provide an indication of the fuel level ("Fuel Level Input") to controller 112. As depicted, fuel level sensor 206 may comprise a float connected to a variable resistor. Alternatively, other types of fuel level sensors may be used.

Fuel pump 121 is configured to pressurize fuel delivered to the injectors of engine 110, such as example injector 166. While only a single injector 166 is shown, additional injectors are provided for each cylinder. It will be appreciated that fuel system 118 may be a return-less fuel system, a return fuel system, or various other types of fuel system. Vapors generated in fuel tank 120 may be routed to fuel vapor canister 122, via conduit 131, before being purged to the engine intake 123.

Fuel vapor canister 122 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 122 may be purged to engine intake 123 by opening canister purge valve 212. While a single canister 122 is shown, it will be appreciated that fuel system 118 may include any number of canisters. In one example, canister purge valve 212 may be a solenoid valve wherein opening or closing of the valve is performed via actuation of a canister purge solenoid.

Canister 122 may include a buffer 122a (or buffer region), each of the canister and the buffer comprising the adsorbent. As shown, the volume of buffer 122a may be smaller than (e.g., a fraction of) the volume of canister 122. The adsorbent in the buffer 122a may be same as, or different from, the adsorbent in the canister (e.g., both may include charcoal). Buffer 122a may be positioned within canister 122 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 122 includes a vent 127 for routing gases out of the canister 122 to the atmosphere when storing, or trapping, fuel vapors from fuel tank 120. Vent 127 may also allow fresh air to be drawn into fuel vapor canister 122 when purging stored fuel vapors to engine intake 123 via purge line 128 and purge valve 212. While this example shows vent 127 communicating with fresh, unheated air, various modifications may also be used. Vent 127 may include a canister vent valve 214 to adjust a flow of air and vapors between canister 122 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 214 may be a solenoid valve wherein opening or closing of the valve is performed via actuation of a canister vent solenoid. In particular, the canister vent valve may be an open that is closed upon actuation of the canister vent solenoid.

As such, hybrid vehicle system 106 may have reduced engine operation times due to the vehicle being powered by engine system 108 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 210 may be optionally included in conduit 131 such that fuel tank 120 is coupled to canister 122 via the valve. During regular engine operation, isolation valve 210 may be kept closed to limit the amount of diurnal or "running loss" vapors directed to canister 122 from fuel tank 120. During refueling operations, and selected purging conditions, isolation valve 210 may be temporarily opened, e.g., for a duration, to direct fuel vapors from the fuel tank 120 to canister 122. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 210 positioned along conduit 131, in alternate embodiments, the isolation valve may be mounted on fuel tank 120.

One or more pressure sensors 220 may be coupled to fuel system 118 for providing an estimate of a fuel system pressure. In one example, the fuel system pressure is a fuel tank pressure, wherein pressure sensor 220 is a fuel tank pressure sensor coupled to fuel tank 120 for estimating a fuel tank pressure or vacuum level. While the depicted example shows pressure sensor 220 directly coupled to fuel tank 120, in alternate embodiments, the pressure sensor may be coupled between the fuel tank and canister 122, specifically between the fuel tank and isolation valve 210. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 221 may also be coupled to fuel system 118 for providing an estimate of a fuel system temperature. In one example, the fuel system temperature is a fuel tank temperature, wherein temperature sensor 221 is a fuel tank temperature sensor coupled to fuel tank 120 for estimating a fuel tank temperature. While the depicted example shows temperature sensor 221 directly coupled to fuel tank 120, in alternate embodiments, the temperature sensor may be coupled between the fuel tank and canister 122.

Fuel vapors released from canister 122, for example during a purging operation, may be directed into engine intake manifold 144 via purge line 128. The flow of vapors along purge line 128 may be regulated by canister purge valve 212, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 112, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 128 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 218 coupled to intake manifold 144, and communicated with controller 112. Alternatively, MAP may be inferred from alternate engine operating conditions, such as mass air flow (MAF), as measured by a MAF sensor (not shown) coupled to the intake manifold.

Fuel system 118 may be operated by controller 112 in a plurality of modes by selective adjustment of the various valves and solenoids. For example, the fuel system may be operated in a fuel vapor storage mode (e.g., during a fuel tank refueling operation and with the engine not running), wherein the controller 112 may open isolation valve 210 and canister vent valve 214 while closing canister purge valve (CPV) 212 to direct refueling vapors into canister 122 while preventing fuel vapors from being directed into the intake manifold.

As another example, the fuel system may be operated in a refueling mode (e.g., when fuel tank refueling is requested by a vehicle operator), wherein the controller 112 may open isolation valve 210 and canister vent valve 214, while maintaining canister purge valve 212 closed, to depressurize the fuel tank before allowing enabling fuel to be added therein. As such, isolation valve 210 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 112 may open canister purge valve 212 and canister vent valve while closing isolation valve 210. Herein, the vacuum generated by the intake manifold of the operating engine may be used to draw fresh air through vent 127 and through fuel vapor canister 122 to purge the stored fuel vapors into intake manifold 144. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 122 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 226 located upstream of the emission control device, temperature sensor 228, MAP sensor 218, pressure sensor 220, and pressure sensor 229. Other sensors such as an ambient temperature sensor, additional pressure and temperature sensors, air/fuel ratio, and composition sensors may be coupled to various locations in the vehicle system 106. As another example, the actuators may include fuel injector 166, isolation valve 210, purge valve 212, vent valve 214, fuel pump 121, and throttle 162.

Control system 114 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 114 may further be configured to receive information via the internet or other communication networks. Information received from the GPS may be cross-referenced to information available via the internet to determine local weather conditions, local vehicle regulations, etc. Control system 114 may use the internet to obtain updated software modules which may be stored in non-transitory memory.

The control system 114 may include a controller 112. Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. During a sleep mode the controller may save energy by shutting down on-board sensors, actuators, auxiliary components, diagnostics, etc. Essential functions, such as clocks and controller and battery maintenance operations may be maintained on during the sleep mode, but may be operated in a reduced power mode. During the sleep mode, the controller will expend less current/voltage/power than during a wake-up mode. During the wake-up mode, the controller may be operated at full power, and components operated by the controller may be operated as dictated by operating conditions. The controller may receive input data from the various sensors, process the input data, and trigger the actuators in response to the processed input data based on instruction or code programmed therein corresponding to one or more routines. An example control routine is described herein with regard to FIG. 4.

Leak detection routines may be intermittently performed by controller 112 on fuel system 118 to confirm that the fuel system is not degraded. As such, leak detection routines may be performed while the engine is off (engine-off leak test)

using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) communicatively coupled to controller 112. An ELCM may be coupled in vent 127, between canister 122 and the atmosphere. The ELCM may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. The ELCM may further include a reference orifice and a pressure sensor. Following the applying of vacuum to the fuel system, a change in pressure at the reference orifice (e.g., an absolute change or a rate of change) may be monitored and compared to a threshold. Based on the comparison, a fuel system leak may be diagnosed.

In order to reduce noise and perform leak tests in a stable environment, a leak test may preferably be performed when the fuel temperature has stabilized. In this way, the cooling of fuel in the fuel tank will not create additional vacuum during the test, which may potentially lead to false results. Depending on ambient conditions, fuel temperature stabilization may take hours. Further, if the vehicle is turned off during morning hours, the fuel temperature may increase due to sun loading and diurnal temperature increases. Thus, waking the PCM and initiating the emissions test at fixed time following a vehicle-off condition may lead to an aborted or inconclusive test. Cycling valves open and closed unnecessarily reduces their expected life, while waking the PCM repeatedly to determine whether fuel temperature has stabilized consumes battery power.

FIG. 3 schematically shows an example comparator circuit 300 operable to wake a powertrain control module at a time point following a vehicle-off condition where the fuel tank temperature and the ambient temperature are equal. For example, comparator circuit 300 may include powertrain control module (PCM) 305. PCM 305 may be included in a vehicle, such as hybrid vehicle 6, as shown in FIG. 1 or hybrid vehicle 106, as shown in FIG. 2. PCM 305 may turn on comparator circuit 300 following a vehicle-off condition when an EONV test is indicated, and may maintain comparator circuit 300 off following a vehicle-off condition when an EONV test is not indicated.

PCM 305 may include wake input 310. Wake input 310 may be coupled to one or more inputs configured to wake up the PCM when the PCM is asleep following a vehicle-off condition. During a sleep mode, the PCM may save energy by shutting down on-board sensors, actuators, auxiliary components, diagnostics, etc. Essential functions, such as clocks and PCM and battery maintenance operations may be maintained on during the sleep mode, but may be operated in a reduced power mode. During the sleep mode, the PCM will expend less current/voltage/power than during a wake-up mode. During the wake-up mode, the PCM may be operated at full power, and components operated by the PCM may be operated as dictated by operating conditions. Wake input 310 may be coupled to circuits that indicate a door-ajar condition, a brake pedal depressed condition, etc. Upon a wake indication, the PCM may initiate fuel rail priming, and/or other pre-ignition strategies that may reduce crank variability. Wake input 310 may be configured to trigger PCM 305 to wake up when a signal is received indicating that the fuel tank temperature and ambient temperature are equal. Wake input 310 may be coupled to op-amp 315. Op-amp 315 may be comprise a first input 316, a second input 317, and an output 318. In this example, first input 316 is configured as a positive input and second input 317 is configured as a negative input. In other examples, these configurations may be reversed. In still other examples, the first and second inputs may have equivalent configurations. In this configuration, wake input 310 is configured to wake PCM 305 when a zero signal is received from output 318. Op-amp 315 is configured to output a zero signal via output 318 when the value of a voltage at first input 316 is equal to the value of a voltage at second input 317.

First input 316 is coupled to engine coolant temperature sensor 320, and configured to receive a signal proportionate to the temperature of the engine coolant. In other examples, first input 316 may be coupled to a fuel tank temperature sensor, and configure to receive a signal proportionate to the temperature inside of the fuel tank. Second input 317 is coupled to ambient air temperature sensor 325, and configured to receive a signal proportionate to the temperature of the ambient air. Ambient air temperature sensor 325 is coupled to second input 317 via gain module 330. Gain module 330 is configured to amplify the signal received from ambient air temperature sensor 325 such that the voltage ranges of the signals received at first input 316 and second input 317 are equivalent. If the voltage ranges of engine coolant temperature sensor 320 and ambient air temperature sensor 325 are equal, gain module 330 may have a gain equal to 1, or gain module 330 may be omitted altogether. If ambient air temperature sensor 325 has a greater voltage range than engine coolant temperature sensor 320, gain module 330 may have a gain less than 1, or may be coupled between engine coolant temperature sensor 320 and first input 316 having a gain greater than 1. Comparator circuit 300 may be configured as a hot-at-all-times circuit. Comparator circuit 300 may receive power from voltage source 335. Voltage source 335 may be a battery or other energy storage device and may be coupled to the comparator circuit via pull-up resistor 340.

FIG. 4 shows a flow chart for an example method 400 for an evaporative emissions test. Method 400 will be described with regard to the systems of FIG. 1-3, but it should be understood that method 400 may be applied to other systems without departing from the scope of this disclosure. Method 400 may be executed by a controller, such as controller 12 or controller 112, and may be stored as instructions in non-transitory memory.

Method 400 begins at 405. At 405, method 400 may include evaluating operating conditions. Operating conditions may be measured, estimated or inferred. Operating conditions may include various vehicle conditions, such as vehicle speed, vehicle occupancy, etc., various engine conditions, such as engine status, engine speed, engine load, intake vacuum, etc., as well as various ambient conditions, such as ambient temperature, barometric pressure, humidity, etc.

Continuing at 410, method 400 may include determining whether an evaporative emissions leak test is indicated for the next engine-off condition. Determining whether an evaporative emission leak test is indicated may include retrieving a flag set in the vehicle powertrain control module (PCM), running an algorithm, retrieving previous evaporative emission leak test data, etc. If no leak test is indicated, method 400 may proceed to 415. At 415, method 400 may include maintaining the current status of the PCM. Method 400 may then end.

If an evaporative emissions leak test is indicated, method 400 may proceed to 420. At 420, method 400 may include determining whether a vehicle-off event is detected. A vehicle-off condition may include a key-off condition, or other indication that the vehicle is no longer being operated. If no vehicle-off condition is detected, method 400 may proceed to 415 and may include maintaining the status of the PCM. If a vehicle-off condition is detected, method 400 may proceed to 425. At 425, method 400 may include shutting down vehicle systems while maintaining the PCM awake. Shutting down vehicle systems may include shutting down engine systems, fuel system components, or other vehicle systems and components that are not necessary for vehicle maintenance during the vehicle-off condition. If the indicated emissions test is based on the development of a fuel tank vacuum due to fuel cooling, the evaporative emissions system may be sealed, for example by closing a canister vent valve.

Continuing at 430, method 400 includes waking a comparator circuit while putting the PCM to sleep. As described with regard to FIG. 3, comparator circuit 300 may draw power from a voltage source, such as the vehicle battery. Power may be applied to an engine coolant temperature sensor, an ambient temperature sensor, an op-amp, and other comparator circuit components such as gain modules and resistors. The comparator circuit may thus be operated while the PCM is sleeping. The comparator circuit may supply a signal to the PCM wake input continuously, at regular intervals, or when a change in voltage output is determined (e.g. if a new output voltage is different from a previous output voltage).

Continuing at 435, method 400 may include determining whether the comparator circuit indicates that the engine coolant temperature is equal to (and/or within a threshold of) the ambient air temperature. For example, utilizing comparator circuit 300, op-amp 315 may output a signal equal to zero when the engine coolant temperature and ambient air temperature are equal. If the engine coolant temperature and ambient air temperature are not equal, method 400 may proceed to 440. At 440, method 400 may include maintaining the PCM asleep, and may further include maintaining the comparator circuit active. If the engine coolant temperature and ambient air temperature are equal, method 400 may proceed to 445. At 445, method 400 may include waking the PCM. Continuing at 450, method 400 may include initiating an evaporative emissions leak test. The evaporative emissions leak test may be initiated by sealing the vehicle fuel system, by closing a canister vent valve, for example. In some examples, the leak test may be performed by an evaporative leak check module (ELCM) comprising a vacuum pump. For example, the ELCM may be coupled between the fuel vapor canister and atmosphere. The ELCM may comprise a reference orifice equivalent to the size of a maximum allowable leak (0.02", for example). The ELCM may initiate the leak test by drawing a vacuum on the reference orifice, and determining a reference pressure. The ELCM may then draw a vacuum on the fuel system, and compare the resulting pressure to the reference pressure. A failure to reach the reference pressure may indicate a leak in the fuel system. In some examples, different sectors of the fuel system may be leak tested separately. For example, a vacuum may be drawn with the FTIV closed, thus checking the canister side for leaks. The FTIV may then be opened, and a vacuum drawn on the fuel tank. In other examples, engine-off natural vacuum may be used to determine the integrity of the fuel system. If the fuel system is sealed prior to sleeping the PCM, a vacuum should develop in the fuel tank as the bulk fuel cools. Failure to reach a threshold vacuum may be indicative of a fuel system leak. Following the leak test, the PCM may indicate degradation responsive to the leak test. Method 400 may then end.

FIG. 5 shows a timeline 500 for an example evaporative emissions test using the method of FIG. 4 applied to the systems of FIGS. 1-3. Timeline 500 includes plot 510, indicating a vehicle-on status over time. Timeline 500 further includes plot 520, indicating a powertrain control module (PCM) status over time. Timeline 500 further includes plot 530, indicating whether an emissions test has been initiated over time. Timeline 500 further includes plot 540, indicating an engine coolant temperature over time, and plot 545, indicating an ambient temperature over time. Timeline further includes plot 550, indicating a voltage at a PCM wake input over time. Line 555 represents a threshold voltage for waking the PCM.

At time $t_0$, the vehicle is on, as indicated by plot 510. As such, the PCM is awake, as indicated by plot 520, and no emissions test has been initiated, as indicated by plot 530. The engine coolant temperature is greater than the ambient temperature, as indicated by plots 540, and 545, respectively. At time $t_1$, the vehicle is turned off. The PCM is maintained awake while vehicle systems are shut down and the fuel system is sealed. At time $t_2$, the PCM is put to sleep. While the PCM is asleep, the comparator circuit is activated. Accordingly a voltage is applied to the wake input of the PCM, as shown by plot 550. As the engine coolant temperature of the recently shut down vehicle is above the ambient temperature, the wake input voltage is above the threshold represented by line 555.

From time $t_2$ to time $t_3$, the engine coolant temperature decreases, approaching the ambient temperature. Accordingly, the wake input voltage decreases. While the wake input voltage is above the threshold, the PCM is maintained asleep, and the emissions test is not initiated. At time $t_3$, the engine coolant temperature and ambient temperature are within a threshold of each other. As such, the wake input voltage reaches the threshold represented by line 555. The PCM is then woken up, and the emissions test is indicated, although the vehicle remains off.

The method described herein and depicted in FIG. 4 along with the systems described herein and depicted in FIGS. 1-3 may enable one or more systems and one or more methods. In one example, a method for a vehicle, comprising: following a vehicle-off event, waking a powertrain control module based on a comparison of an ambient temperature and a bulk fuel temperature; and then initiating an evaporative emissions system leak test. The method may further comprise: following the vehicle-off event, sleeping the powertrain control module without waking the powertrain control module; and then waking the powertrain control module only when the ambient temperature is within a threshold of the bulk fuel temperature. In some examples, the method may further comprise maintaining a comparator circuit awake while the powertrain control module is asleep. The comparator circuit may be configured to output a voltage based on a comparison of the ambient temperature and the bulk fuel temperature. The comparator circuit may be configured to output a zero voltage when the ambient temperature is equal to the bulk fuel temperature. The bulk fuel temperature may be estimated based on an output of an engine coolant temperature sensor. The method may further comprise: sleeping the comparator circuit responsive to waking the powertrain control module. In some examples, the method may further comprise: sealing a vehicle fuel system prior to sleeping the powertrain control module; and indicating degradation responsive to the initiated leak test. The technical result of implementing this method is an increase in the execution rate of the evaporative emissions system leak test. The evaporative emission leak test may be initiated without waking the powertrain control module arbitrarily. In contrast, when waking the powertrain control module at an arbitrary time point, changes in weather following the vehicle-off event may lead to a failure to meet testing entry conditions, thus reducing the execution rate of the leak test.

In another example, a fuel system for a vehicle, comprising: a powertrain control module comprising a wake input, the wake input configured to wake the powertrain control module responsive to a ratio of a bulk fuel temperature to an ambient air temperature decreasing below a threshold. The powertrain control module may be configured with instructions stored in non-transitory memory that when executed cause the powertrain control module to: sleep following a vehicle-off event; wake responsive to the wake input indicating that the ratio of the bulk fuel temperature to the ambient air temperature has decreased below a threshold; and then initiate an evaporative emissions system leak test. The fuel system may further comprise: a comparator circuit coupled to the wake input, the comparator circuit configured to stay awake while the powertrain control module sleeps, and further configured to output a voltage indicating the ratio of the bulk fuel temperature to the ambient air temperature. The comparator circuit may further comprises: an op-amp comprising a first input, a second input, and an output coupled to the wake input; an engine coolant temperature sensor coupled to the first input; and an ambient air temperature sensor coupled to the second input. In some example, the comparator circuit may further comprise: a gain module coupled between the ambient air temperature sensor and the second input of the op-amp, the gain module configured to adjust a voltage output by the ambient air temperature sensor such that the first input and the second input receive equivalent voltages when an ambient air temperature and an engine coolant temperature are equal. The fuel system may further comprise: a voltage source coupled to the comparator circuit, the voltage source configured to maintain the comparator circuit awake while the powertrain control module sleeps. The powertrain control module may be further configured with instructions stored in non-transitory memory that when executed cause the powertrain control module to: stay awake following a vehicle-off event; shut down vehicle systems; and then sleep without waking until a voltage at the wake input decreases below a threshold. The comparator circuit may be configured to output a zero voltage when an ambient temperature is equal to a bulk fuel temperature. The technical result of implementing this system is an increase in the robustness of the leak test. By initiating the test only when the ratio of the bulk fuel temperature to the ambient air temperature has decreased below a threshold, the test may produce fewer false results as well as fewer aborted tests as compared to initiating the test at an arbitrary time following a vehicle-off event.

In yet another example, an evaporative emissions system for a vehicle, comprising: a fuel tank coupled to a fuel vapor canister; a powertrain control module comprising a wake input; a comparator circuit coupled to the wake input, the comparator circuit configured to output a voltage indicating a ratio of engine coolant temperature to ambient temperature; and wherein the powertrain control module is configured with instructions stored in non-transitory memory that when executed cause the powertrain control module to: sleep following a vehicle-off event; wake responsive to the wake input indicating that the ratio of engine coolant temperature to ambient air temperature has decreased below a threshold; and then initiate an evaporative emissions system leak test; and set a diagnostic code responsive to results of the evaporative emissions system leak test. The comparator circuit may further comprise: an op-amp comprising a first input, a second input, and an output coupled to the wake input; an engine coolant temperature sensor coupled to the first input; and an ambient air sensor coupled to the second input. The evaporative emissions system may further comprise: a voltage source coupled to the comparator circuit, the voltage source configured to maintain the comparator circuit awake while the powertrain control module sleeps. The evaporative emissions system may further comprise: a leak check module comprising a vacuum pump, the leak check module coupled between the fuel vapor canister and atmosphere. The technical result of implementing this system is a retention of battery charge, and further may increase the lifespan of fuel system valves. By only initiating the leak test when it is likely to run to completion, battery charge may be conserved, and unnecessary cycling of fuel system valves can be reduced.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
following a vehicle-off event, receiving, at a wake input of a controller, a signal from a comparator circuit indicating that an ambient temperature is within a threshold of a bulk fuel temperature, and in response, waking the controller from a sleep state; and
following waking the controller, initiating an evaporative emissions system leak test.

2. The method of claim 1, further comprising:
following the vehicle-off event, sleeping the controller by shutting down one or more processes; and
waking the controller by powering up the one or more processes shut down during sleep.

3. The method of claim 1, wherein the controller is capable of two states:
a wake state wherein the controller draws full power and operates as conditions require; and
the sleep state wherein the controller draws less power than the wake state and one or more processes are shut down.

4. The method of claim 2, further comprising:
sealing a vehicle fuel system prior to sleeping the controller; and
indicating degradation responsive to the initiated leak test.

5. The method of claim 2, further comprising:
maintaining the comparator circuit awake while the controller is asleep, and sleeping the comparator circuit responsive to waking the controller.

6. The method of claim 5, wherein the signal received from the comparator circuit is an output voltage of the comparator circuit.

7. The method of claim 6, where the bulk fuel temperature is estimated based on an output of an engine coolant temperature sensor, and further comprising:
receiving, at a first input of the comparator circuit, a first voltage output from an ambient temperature sensor;
receiving, at a second input of the comparator circuit, a second voltage output from the engine coolant temperature sensor; and
when the first voltage output is equal to the second voltage output, generating the signal from the first voltage output and the second voltage output, where the signal is a zero voltage signal.

8. A fuel system for a vehicle, comprising:
a controller comprising a wake input,
an engine coolant temperature sensor, and
an ambient air temperature sensor,
wherein the controller includes instructions stored in non-transitory memory for:
waking the controller, via the wake input, from a sleep state responsive to a ratio of a signal of the engine coolant temperature sensor to a signal of the ambient air temperature sensor decreasing below a threshold.

9. The fuel system of claim 8, where the instructions further comprise:
entering the sleep state wherein one or more processes are shut down, following a vehicle-off event; and
following the waking, initiating an evaporative emissions system leak test.

10. The fuel system of claim 8, further comprising:
a comparator circuit coupled to the wake input, the comparator circuit configured to stay awake while the controller sleeps, and further configured to output a voltage indicating the ratio.

11. The fuel system of claim 10, further comprising:
a voltage source coupled to the comparator circuit, the voltage source configured to maintain the comparator circuit awake while the controller sleeps.

12. The fuel system of claim 10, wherein the instructions further include:
staying awake following a vehicle-off event;
shutting down vehicle systems; and then
sleeping until a voltage at the wake input decreases below a threshold.

13. The fuel system of claim 10, where the comparator circuit further comprises:
an op-amp comprising a first input, a second input, and an output coupled to the wake input;
wherein the engine coolant temperature sensor is coupled to the first input; and
wherein the ambient air temperature sensor is coupled to the second input.

14. The fuel system of claim 13, where the comparator circuit further comprises:
a gain module coupled between the ambient air temperature sensor and the second input of the op-amp, the gain module configured to adjust a voltage output by the ambient air temperature sensor such that the first input and the second input receive equivalent voltages when ambient air temperature and engine coolant temperature are equal.

15. The fuel system of claim 8, wherein the sleep state comprises shutting down one or more processes which include one or more of sensors, actuators, and diagnostics, the controller using less energy than when operating at full power; and
wherein waking the controller comprises powering up the one or more processes and operating at full power.

16. An evaporative emissions system for a vehicle, comprising:
a fuel tank coupled to a fuel vapor canister;
a controller comprising a wake input;
a comparator circuit coupled to the wake input, the comparator circuit configured to output a voltage indicating a ratio of engine coolant temperature to ambient temperature; and
wherein the controller comprises instructions stored in non-transitory memory that when executed cause the controller to:
following a vehicle-off event, enter a sleep state wherein one or more processes are shut down;
wake responsive to the wake input indicating that the ratio of engine coolant temperature to ambient temperature has decreased below a threshold;
initiate an evaporative emissions system leak test; and
set a diagnostic code responsive to results of the evaporative emissions system leak test.

17. The evaporative emissions system of claim 16, where the comparator circuit further comprises:
an op-amp comprising a first input, a second input, and an output coupled to the wake input;
an engine coolant temperature sensor coupled to the first input; and
an ambient air sensor coupled to the second input.

18. The evaporative emissions system of claim 16, further comprising:
a voltage source coupled to the comparator circuit, the voltage source configured to maintain the comparator circuit awake while the controller sleeps.

19. The evaporative emissions system of claim 16, further comprising:
  a leak check module comprising a vacuum pump, the leak check module coupled between the fuel vapor canister and atmosphere.

20. The evaporative emissions system of claim 16, wherein power is maintained to a clock and a battery maintenance operation during the sleep state.

\* \* \* \* \*